United States Patent

Davidson

[15] 3,650,362
[45] Mar. 21, 1972

[54] TORQUE LIMITING DEVICES

[72] Inventor: John Bruce Davidson, Angus, Scotland

[73] Assignee: Coventry Gauge & Tool Company Limited, Coventry, England

[22] Filed: July 13, 1970

[21] Appl. No.: 54,131

[52] U.S. Cl.........................................192/56 R, 192/84 A
[51] Int. Cl..........................................F16d 43/20
[58] Field of Search.........192/84.84 B, 84 A, 84 AA, 84 AB, 192/56, 56 F, 56 R, 84 C

[56] References Cited

UNITED STATES PATENTS

| 3,559,784 | 2/1971 | Miller | 192/56 |
| 2,759,580 | 8/1956 | Bower | 192/56 X |

FOREIGN PATENTS OR APPLICATIONS

| 710,150 | 5/1965 | Canada | 192/84 |
| 663,759 | 5/1963 | Canada | 310/92 |

*Primary Examiner*—D. X. Sliney
*Attorney*—Watson, Cole, Grindle & Watson

[57] ABSTRACT

A torque limiting device is provided in which a pair of opposed driving and driven toothed members or rings are normally held in meshing engagement by magnetic or electromagnetic means and an armature to the latter, generally V-form teeth of the rings riding out of engagement on excess torque which causes movement of the rings apart and in turn creates an air gap between the magnet and armature whereby the magnetic field is greatly weakened to prevent re-engagement of the toothed rings until resetting action is taken by closing a switch in parallel with a resistor so as to increase current flow to the coil of the electromagnetic means for obtaining re-engagement of the toothed members or rings which engagement is maintained by reduced current flow via the resistor when the switch is opened for normal operation of the device. The resistor may be variable for obtaining variation in the torque limiting action.

2 Claims, 3 Drawing Figures

INVENTOR:-
JOHN BRUCE DAVIDSON.

Patented March 21, 1972

INVENTOR:
JOHN BRUCE DAVIDSON.

BY
Watson, Cole, Grindle & Watson
ATTORNEY

TORQUE LIMITING DEVICES

The object of this invention is to provide a compact torque limiting device which can be readily controlled for obtaining an infinitely variable torque limiting action, while further objects include provision for readily setting or resetting the device ready for drive transmission and also whereby substantially no residual torque occurs in the disengaged condition of the device.

Many advantages in such respect will be apparent from the following detailed description made in accordance with the accompanying drawings wherein.

Figure 1:
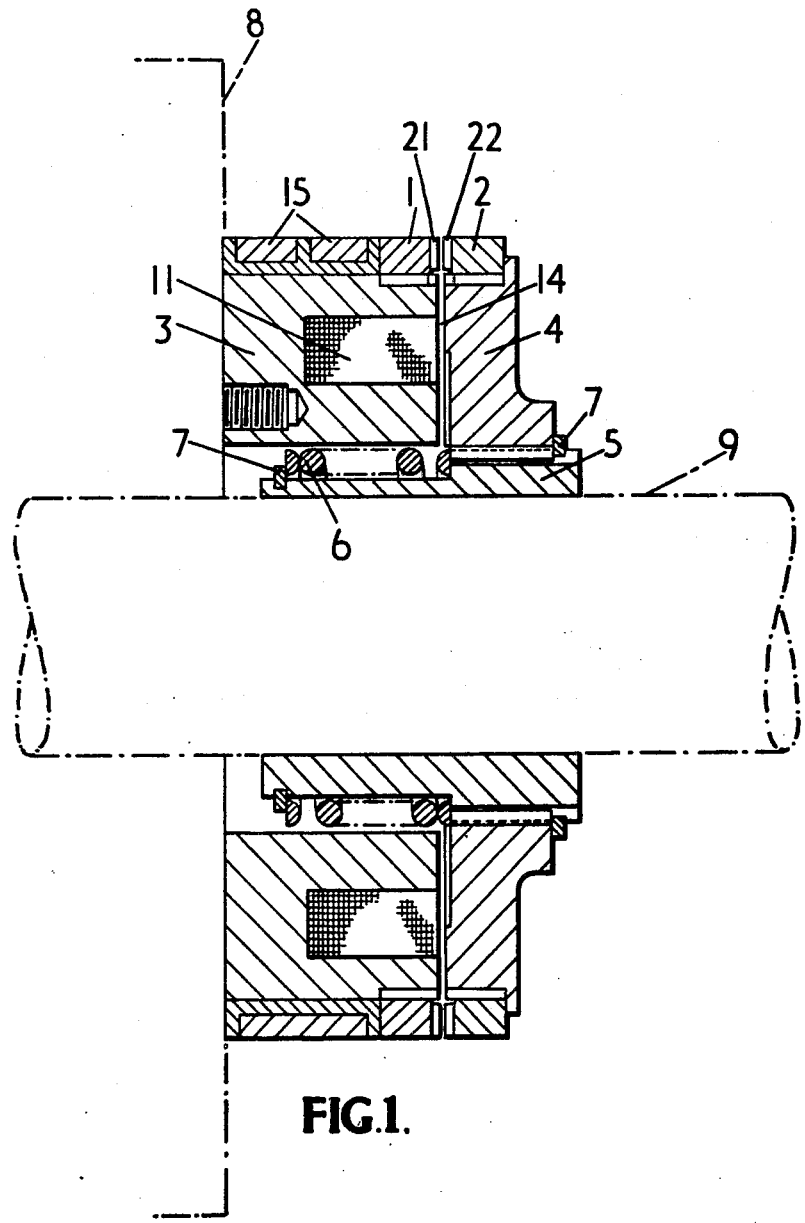
FIG. 1 is an axial plane section of a torque limiting device embodying this invention.
Figure 2:
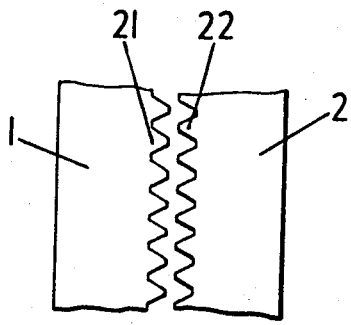
FIG. 2 is a detail radial view on an enlarged scale of the form of meshing teeth.

Referring to FIGS. 1 and 2, coaxial rings 1, 2 are provided with radially arranged axially extending V-form serrations or teeth 21, 22 on their opposed faces and which are arranged to intermesh for the purpose of torque or drive transmission.

The ring 1 is shown mounted on an electromagnet 3 of conventional form and is secured to the latter against relative rotary or axial movement. The other ring 2 is similarly mounted on an annular member or flange 4 serving as an armature for the magnet 3 and has a sliding splined engagement with a hub 5.

The magnet 3 is arranged to be bolted or otherwise secured to a rotary member indicated at 8 which may be a driving member for imparting a drive to a shaft indicated at 9 and received by the hub 5 when the magnet 3 and armature 4 are in meshing driving engagement by their toothed rings 1, 2. However the drive may be in an opposite sense i.e., from a shaft 9 carrying the hub 5 to the rotary member 8 secured to the magnet 3. When the rings 1, 2 are disengaged relative or opposite rotation of the magnet 3 and armature 4 is able to take place.

The magnet 3 is axially located relative to the hub 5 e.g., by its mounting on the driving or driven member 8 and is shown of annular form so as to accommodate with clearance part of the hub 5 for relative rotation. Whereas the magnet 3 may derive bearing support from the hub 5, it is preferably fully supported by the driven or driving member 8 i.e., where the latter is loosely carried by a through shaft 9 carrying the hub 5.

The armature 4 is spring urged away from the magnet 3 by spring means acting between it and the hub such as a preloaded compression spring 6 which, together with the armature 4, is located between circlips 7, 7 or other suitable retaining means on the hub 5.

Figure 3:
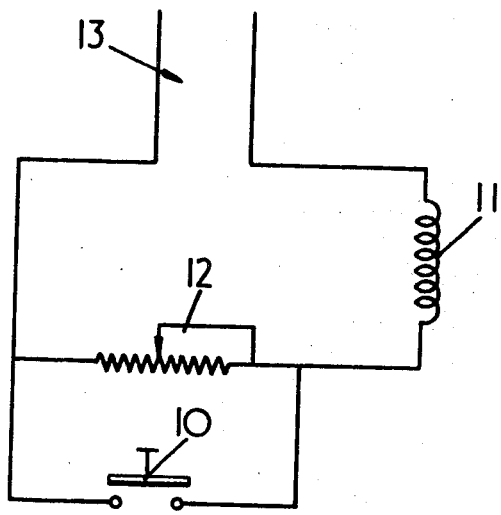
FIG. 3 is a control circuit diagram.

Referring to FIG. 3 a suitable electric control circuit is shown for obtaining variable energization of the coil 11 of the magnet 3. The circuit includes a direct current supply at 13 in series with the coil 11 and a setting or resetting switch 10 i.e., of the push type indicated while a variable resistor 12 is provided in parallel with the switch 10. The minimum resistance of the resistor 12 is such that it limits the voltage to the magnet coil 11 so that in the disengaged condition of the device, i.e., with the rings 1, 2 out of mesh, the magnet 3 is unable to attract the armature 4 across the air gap 14 and against the resistance of the compression spring means 6.

The operation of the device is as follows:

With the members of the device in a stationary condition and with the rings 1, 2 disengaged, current is supplied to the magnet coil 11 as limited by the resistor 12 but the relatively low resultant force is unable to attract the armature 4. On operating the push switch 10 full voltage is supplied to the coil 11 thereby effecting maximum attraction of the armature 4 and which overcomes the spring resistance at 6 and brings the serrated or toothed rings 1, 2 into mesh. On releasing switch 10 a reduced voltage feed is maintained to the coil 11 via the resistor 12 which, by virtue of the elimination of the air gap 14 in the engaged position of the rings 1, 2 provides the necessary load for maintaining such engagement. The input driving load is then brought into operation and torque is transmitted e.g., from the driving member 8 via the armature 4 and meshing rings 1, 2 to the hub 5 and shaft 9 received by the latter or vice versa.

When a predetermined torque has been reached or exceeded the reaction, due to the V-form of the serrations or teeth 21, 22 of the rings 1, 2 (see FIG. 3) creates an axial thrust which overcomes the attractive force of the magnet 3 (as determined by the value or setting of the resistor 12). As a result the teeth 21, 22 ride out of mesh and so create the air gap 14 between the magnet 3 and armature 4 which thus weakens the magnetic flux or field so that the axial thrust together with the release action of the compression spring means 6 serve to completely and instantly disengage the drive between the rings 1, 2 and hence between the magnet 3 and armature 4. Due to the air gap 14 the magnetic flux or field between the magnet 3 and armature 4 is weakened to an extent such that it is insufficient to effect reengagement of the rings 1, 2 which thus remain out of toothed engagement. When the driving member has been arrested and the cause of the overload removed, the torque limiting device is reengaged in the manner already referred to simply by depressing the reset switch 10.

By varying the value or setting of the resistor 12, the torque limiting capacity of the device can be correspondingly varied in an infinite manner in accommodating for various working conditions or requirements. Furthermore, and on the device becoming disengaged due to overload, the absence of mechanical connection between the magnet 3 and armature 4 results in virtually no residual torque occurring during such disengagement.

Current supply to the magnet 3 is shown by means of the usual slip rings 15. However, if desired, a stationary field arrangement may be employed using a nonrotatable magnet or coil assembly of the latter in which event bearings would be interposed between the magnet 3 and ring 1 while the latter would be rotationally secured to the driving or driving member 8.

What I claim is:

1. A torque limiting device comprising a pair of opposed coaxially arranged driving and driven members which are capable of relative rotation and relative axial movement and are provided with serrations or teeth at their opposed faces and are further arranged to be held with their serrations or teeth in meshing engagement by the action of electromagnetic means and an armature thereto, the serrations or teeth being of generally V-form so as to ride out of engagement on the torque transmitted by said members reaching or exceeding a predetermined value in order to axially thrust said members apart out of engagement and whereby an air gap is created between the electromagnetic means and armature such that the operative magnetic flux or field between them is weakened to an extent which is insufficient to effect reengagement of the disengaged members, said device including in combination therewith electric current supply means to the coil of the electromagnetic means, said electric current supply means including a resistor and a setting or resetting switch connected in parallel with one another and both connected in series with the coil whereby closing of the switch increases current flow to the coil for obtaining engagement or reengagement of the coaxial members which is maintained by reduced current flow to the coil solely via the resistor when the switch is opened for normal operation of the device, i.e., until such time as the torque transmitted by said coaxial members reaches or exceeds a predetermined value.

2. A torque limiting device according to claim 1 wherein the resistor is variable for obtaining variation in the torque limiting action of the coaxial members and hence of the predetermined value of maximum torque transmission thereby.

* * * * *